US012496421B2

(12) United States Patent
Kremeier

(10) Patent No.: US 12,496,421 B2
(45) Date of Patent: Dec. 16, 2025

(54) VENTILATION APPARATUS AND SYSTEM FOR THE VENTILATION OF AT LEAST TWO PATIENTS

(71) Applicant: Loewenstein Medical Technology S.A., Luxembourg (LU)

(72) Inventor: Peter Kremeier, Karlsruhe (DE)

(73) Assignee: Loewenstein Medical Technology S.A., Luxembourg (LU)

( * ) Notice: Subject to any disclaimer, the term of this patent is extended or adjusted under 35 U.S.C. 154(b) by 1082 days.

(21) Appl. No.: 17/213,553

(22) Filed: Mar. 26, 2021

(65) Prior Publication Data

US 2021/0299390 A1    Sep. 30, 2021

(30) Foreign Application Priority Data

Mar. 27, 2020   (DE) .......................... 102020001962.5
Apr. 3, 2020    (DE) .......................... 102020002139.5

(51) Int. Cl.
*A61M 16/08*    (2006.01)
*A61M 16/00*    (2006.01)
(Continued)

(52) U.S. Cl.
CPC .... *A61M 16/0875* (2013.01); *A61M 16/0057* (2013.01); *A61M 16/06* (2013.01);
(Continued)

(58) Field of Classification Search
CPC .......... A61M 16/0875; A61M 16/0057; A61M 16/06; A61M 16/0816; A61M 16/208; A61M 2016/0027; A61M 16/0066; A61M 16/0833; A61M 2016/003; A61M 2205/3331; A61M 2205/505; A61M 2230/205; A61M 16/022; A61M 16/0858; A61M 16/0883; A61M 16/201; A61M 2205/84; A61M 15/0013; A61M 15/0018; A61M 2205/33; A61M 2205/3507; A61M 2205/353; A61M 2016/0039; A61M 2016/0042; A61M 16/209; A61M 16/105; A61M 16/003; A61M 16/0072; A61M 16/0075; A61M 16/0078; A61M 16/0081;
(Continued)

(56) References Cited

U.S. PATENT DOCUMENTS 5,379,650 A * 1/1995 Kofoed .................... G01F 1/50
                                              73/861.75
5,497,767 A * 3/1996 Olsson ................. A61M 16/00
                                              128/205.13
(Continued)

*Primary Examiner* — Valerie L Woodward
*Assistant Examiner* — Jaeick Jang
(74) *Attorney, Agent, or Firm* — Abel Schillinger, LLP

(57) ABSTRACT

The invention relates to a hose system with an inspiratory hose portion which is configured for connection to a respective inspiration channel of a ventilation apparatus and which is configured to convey an inspiratory respiratory gas flow from the ventilation apparatus to a patient interface. The inspiratory hose portion has a hose adapter which is configured for connection to the inspiration channel of the ventilation apparatus. The hose adapter has a hose branch point from which at least two inspiration branches branch off, wherein each inspiration branch has at least one attachment piece for connection to a patient interface.

10 Claims, 4 Drawing Sheets

(51) Int. Cl.
*A61M 16/06* (2006.01)
*A61M 16/20* (2006.01)

(52) U.S. Cl.
CPC ...... *A61M 16/0816* (2013.01); *A61M 16/208* (2013.01); *A61M 2016/0027* (2013.01)

(58) Field of Classification Search
CPC .............. A61M 16/0084; A61M 16/10; A61M 2230/202; A61M 2230/204; A61M 2230/40; A61M 2230/432; A61M 2230/435
See application file for complete search history.

(56) References Cited

U.S. PATENT DOCUMENTS

| | | | | |
|---|---|---|---|---|
| 6,474,334 | B1 * | 11/2002 | Lemer | A61M 16/022 |
| | | | | 128/204.26 |
| 6,533,730 | B2 * | 3/2003 | Strom | A61M 16/024 |
| | | | | 600/533 |
| 7,861,608 | B2 * | 1/2011 | Furey | G01D 11/245 |
| | | | | 73/866.5 |
| 9,808,612 | B2 * | 11/2017 | Gulliver | A61M 16/161 |
| 11,191,914 | B2 * | 12/2021 | Ahmad | A61M 16/0003 |
| 2017/0128693 | A1 * | 5/2017 | Darowski | A61M 16/202 |

* cited by examiner

VENTILATION APPARATUS AND SYSTEM FOR THE VENTILATION OF AT LEAST TWO PATIENTS

CROSS-REFERENCE TO RELATED APPLICATIONS

The present application claims priority under 35 U.S.C. § 119 of German Patent Application No. 10 2020 001 962.5, filed Mar. 27, 2020, and of German Patent Application No. 10 2020 002 139.5, filed Apr. 3, 2020, the entire disclosures of which are expressly incorporated by reference herein.

BACKGROUND OF THE INVENTION

1. Field of the Invention

The invention relates to a hose system, a ventilation apparatus and a ventilation system for connecting at least two patients to a ventilation apparatus and thereby ventilating them.

2. Discussion of Background Information

Conventional ventilation apparatuses are connected to a hose and are suitable for the ventilation of one patient.

When multiple patients have to be ventilated simultaneously, the number of apparatuses therefore has to be equal to the number of patients. This is disadvantageous, since ventilation apparatuses are quite expensive and are not available in many situations.

It would therefore be advantageous to be able to connect several patients to one ventilation apparatus and thereby ventilate them.

SUMMARY OF THE INVENTION

The present invention makes available a hose system with an inspiratory hose portion which is configured for connection to a respective inspiration channel of a ventilation apparatus and which is configured to convey an inspiratory respiratory gas flow from the ventilation apparatus to a patient interface,
  wherein the inspiratory hose portion has a hose adapter
    which is configured for connection to the inspiration channel of the ventilation apparatus,
    wherein the hose adapter has a hose branch point from which at least two inspiration branches branch off,
  wherein each inspiration branch has
  at least one attachment piece for connection to a patient interface.

In the hose system, each inspiration branch also advantageously has at least one nonreturn valve.

In the hose system, each inspiration branch also advantageously has at least one valve.

In the hose system, the valve is configured for example as an adjustable throttle valve, in order to adjust the inspiratory flow.

In the hose system, the valve is for example an adjustable PEEP valve, which is configured as an adjustable throttle valve, in order to adjust the inspiratory flow.

In the hose system, each inspiration path also advantageously has at least one closeable tap for respiratory gas.

In the hose system, the closeable tap is for example a Luer connector.

In the hose system, the closeable tap is for example arranged downstream from the valve in an inspiratory flow direction.

In the hose system, the closeable tap is for example configured and designed for connection to a pressure measurement port of the ventilation apparatus.

In the hose system, the tap is connected to a pressure measurement port of the ventilation apparatus and thus permits a separate pressure determination in the branch of the hose system (for patient 2).

Moreover, by way of the valve for patient 2, a separate pressure can be set for the relevant branch of the hose system, which separate pressure is lower than the pressure for patient 1.

In the hose system, at least four inspiration branches, for example, branch off from the hose branch point. This permits ventilation of four patients.

In the hose system, at least two further inspiration branches, for example, branch off from each inspiration branch. This permits ventilation of four patients.

Subject matter of the present invention also is a hose system with at least one expiratory hose portion. The hose system according to the invention preferably has, alternatively or in addition, an expiratory hose portion which is configured for connection to a respective expiration channel of a ventilation apparatus and which is configured to convey an expiratory respiratory gas flow from the patient interface to the ventilation apparatus,
  wherein the expiratory hose portion has a hose adapter
    which is configured for connection to the expiration channel of the ventilation apparatus,
    wherein the hose adapter has a hose branch point from which at least two expiration branches branch off,
  wherein each expiration branch has
  at least one attachment piece for connection to a patient interface.

In the hose system, it is additionally possible, for example, that each inspiration branch has at least one nonreturn valve and/or each expiration branch has at least one nonreturn valve.

The expiratory hose portion E can additionally have at least one valve E-6 in at least one expiration branch E-3. The valve can be configured and designed to adjust an expiratory pressure in the respective expiration branch.

Subject matter of the present invention also is a hose system with at least one inspiratory hose portion and at least one expiratory hose portion. The hose system according to the invention preferably comprises, alternatively or additionally, an inspiratory hose portion which is configured for connection to a respective inspiration channel of a ventilation apparatus and which is configured to convey an inspiratory respiratory gas flow from the ventilation apparatus to a patient interface,
  wherein the inspiratory hose portion has a hose adapter
    which is configured for connection to the inspiration channel of the ventilation apparatus,
    wherein the hose adapter has a hose branch point from which at least two inspiration branches branch off,
  wherein each inspiration branch has
  at least one attachment piece for connection to a patient interface,
  wherein the hose system has an expiratory hose portion
    which is configured for connection to a respective expiration channel of a ventilation apparatus and which is configured to convey an expiratory respiratory gas flow from the patient interface to the ventilation apparatus, wherein the expiratory hose portion has a hose adapter which is configured for connection to the expiration channel of the ventilation apparatus,
wherein the hose adapter has a hose branch point from which at least two expiration branches branch off, wherein each expiration branch has
at least one attachment piece for connection to a patient interface.

The hose system can have a one-part or multi-part design. In particular, the hose adapter can be a separate part or an integral constituent part of the hose system, for example simply the open end.

In particular, the attachment piece can be a separate part or an integral constituent part of the hose system, for example simply the open end.

The present invention also relates to a ventilation apparatus. The ventilation apparatus according to the invention has at least one inspiration channel and/or an expiration channel for attaching a hose system according to the invention.

Subject matter of the present invention also is a ventilation system. The ventilation system according to the invention comprises at least one hose system according to the invention and a ventilation apparatus according to the invention.

The ventilation system according to the invention comprises a hose system and a ventilation apparatus, wherein the ventilation apparatus has a display device which shows at least two pressure curves, and wherein the pressure 150 corresponds to the pressure which is predefined by the ventilation apparatus and which is present in the inspiration channel (and in the inspiratory hose portion I), wherein the inspiratory hose portion I divides into at least two inspiration branches I-3 (for two patients), wherein in at least one inspiration branch at least one adjustable valve I-6 is arranged which is configured and designed to adjust the inspiratory flow and/or pressure for this branch, wherein the inspiratory hose portion I additionally has, downstream from the valve I-6 in the direction of flow, a tap I-8 which is configured and designed for the determination of a pressure, wherein the tap I-8 permits a separate pressure determination 250 in the inspiration branch I-3 (for patient 2), wherein the pressure 150 is present in the inspiration branch I-3 (for patient 1), and wherein the pressure 250 is for example less than the pressure 150.

The dependent claims relate to various advantageous developments of the present invention which are independent of one another and of which the features can, within the scope of what is technically meaningful, be freely combined with one another by a person skilled in the art. In particular, this also applies beyond the boundaries of the various claim categories.

It will be noted that, with respect to method-related definitions of terms, and the effects and advantages of those features, reference is made in full to the above explanations of corresponding definitions, effects and advantages relating to the device(s) according to the invention. Accordingly, disclosures herein concerning the device(s) according to the invention may be used accordingly for the definition of the method according to the invention, and disclosures herein concerning the method according to the invention may be used accordingly for the definition of the device(s) according to the invention. Repetition of explanations of features of identical meaning and the effects and advantages thereof is thus substantially avoided.

BRIEF DESCRIPTION OF THE DRAWINGS

Further features and advantages of the invention will become clear from the following description of non-limiting exemplary embodiments of the invention, which are explained in more detail below with reference to the drawing. In this schematic drawing.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
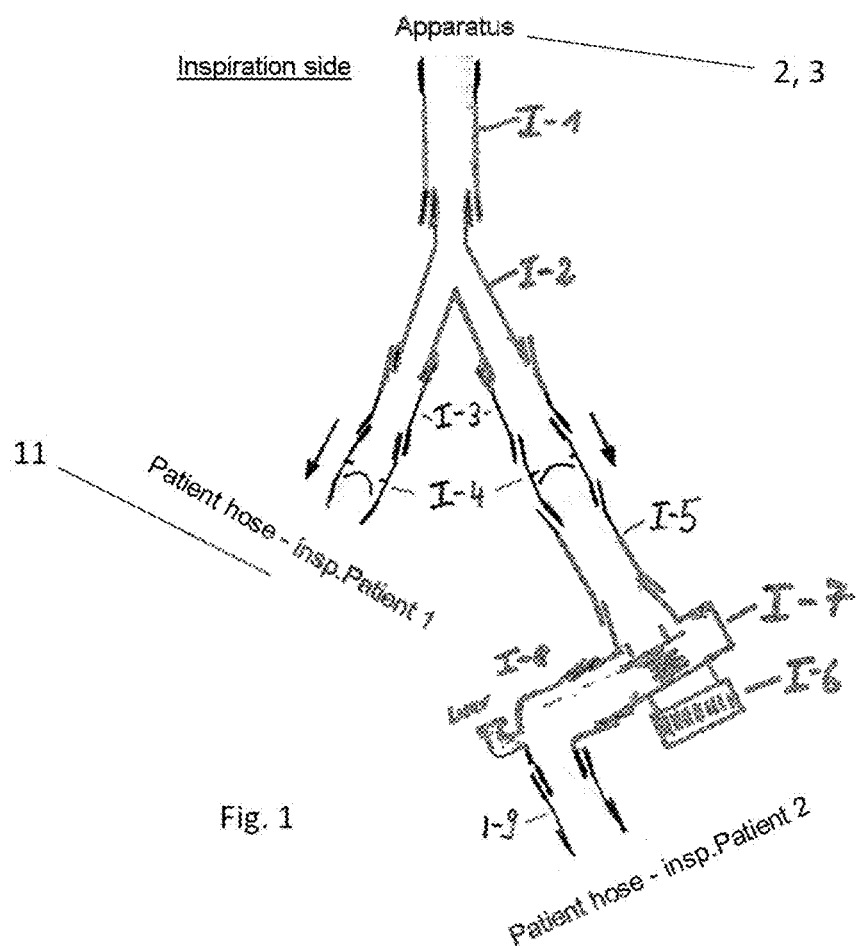
FIG. 1 shows a schematic view of the hose system with the inspiratory hose portion

FIG. 1 shows a hose system with the inspiratory hose portion.

The hose system 1 has at least one inspiratory hose portion I which is configured for connection to a respective inspiration channel 3 of a ventilation apparatus 2 and which is configured to convey an inspiratory respiratory gas flow from the ventilation apparatus to a patient interface 11. The inspiratory hose portion I has a hose adapter I-1 which is configured for connection to the inspiration channel 3 of the ventilation apparatus 2. The hose adapter I-1 has a hose branch point I-2 from which at least two inspiration branches I-3 branch off. Each inspiration branch I-3 has at least one attachment piece I-9 for connection to a patient interface 11. The patient interface 11 can be a Y-piece which is connected to a mask or to a tube, or the patient interface can be directly a mask or a tube.

The inspiratory hose portion I can additionally have at least one nonreturn valve I-4 in each inspiration branch I-3.

The inspiratory hose portion I can additionally have at least one valve I-6 in each inspiration branch I-3.

The valve I-6 is configured for example as an adjustable throttle valve, in order to adjust the inspiratory flow.

The valve I-6 is for example an adjustable PEEP valve I-6, which is configured as an adjustable throttle valve, in order to adjust the inspiratory flow.

The inspiratory hose portion I can additionally have, in each inspiration branch I-3, at least one tap I-8 for respiratory gas.

The closeable tap I-8 can be a Luer connector.

The closeable tap I-8 (Luer connector) can be arranged downstream from the valve I-6 in an inspiratory flow direction and can be configured and designed for connection to a pressure measurement port 114 of the ventilation apparatus.

The tap I-8 is then connected to a pressure measurement port 114 of the ventilation apparatus 2 and thus permits a separate pressure determination for patient 2. Moreover, by way of the valve I-6, a separate pressure can be set for patient 2 (which is lower than the pressure for patient 1). The tap I-8 can also be a pressure sensor, which permits a pressure determination in the hose portion.

Moreover, at least four inspiration branches I-3 can branch off from the hose branch point I-2, or at least two further inspiration branches I-3 can branch off from each inspiration branch I-3.

Each inspiration branch I-3 has for example at least one nonreturn valve I-4, in order to decouple the patients from each other.

The inspiratory hose portion I can have a one-part or multi-part design. For example, different functional parts and hoses can be connected such that they yield the inspiratory hose portion I.

For example

| Item | Number | Hose |
|---|---|---|
| I-1 | 1 | 22 mm hose 2x female |
| I-2 | 1 | Y-piece |
| I-3 | 2 | connector 2x 22 mm female |
| I-4 | 2 | directional valve (2x male) |
| I-5 | 1 | 22 mm hose 2x female |
| I-6 | 1 | adjustable PEEP valve |
| I-7 | 1 | PEEP valve adapter |
| I-8 | 1 | angle adapter rigid with Luer |
| I-9 | 1 | connector 22_M + 15_F/22_M |

Figure 2:
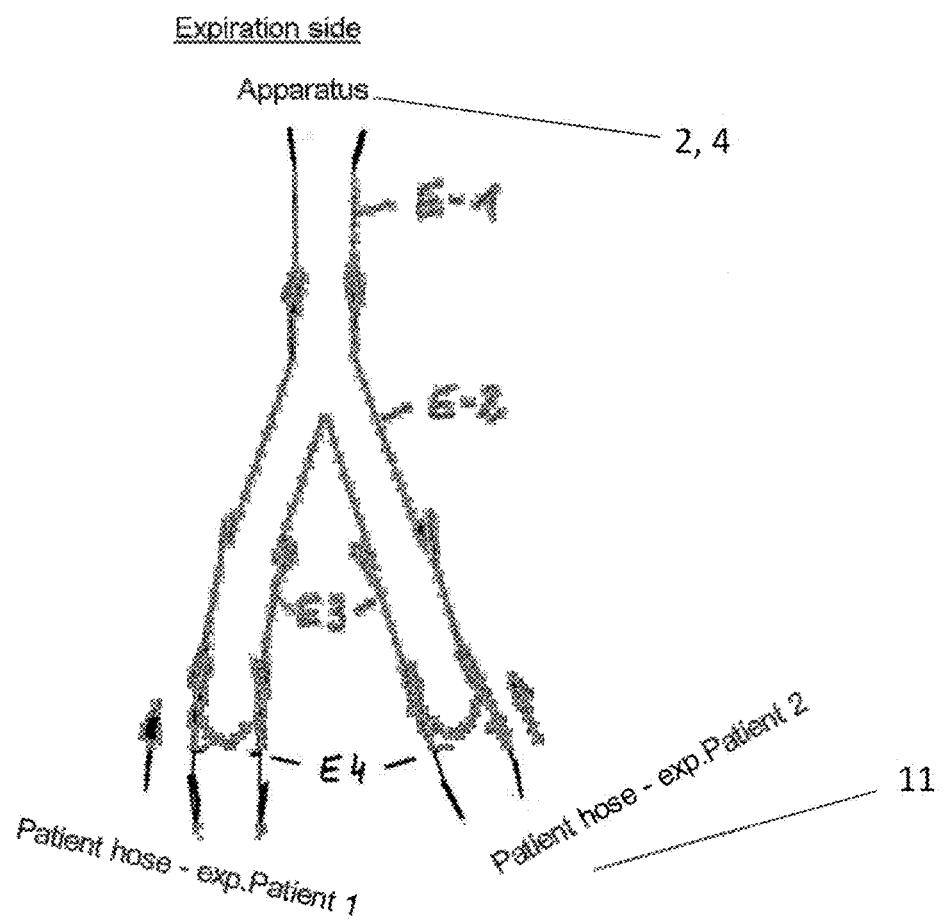
FIG. 2 shows a schematic view of the hose system according to the invention with the expiratory hose portion

FIG. 2 shows the expiratory hose portion E

The hose system 1 also has, for example, an expiratory hose portion E which is configured for connection to a respective expiration channel 4 of a ventilation apparatus 2. The expiratory hose portion E is configured to convey an expiratory respiratory gas flow from the patient interface 11 to the ventilation apparatus or into the environment.

The expiratory hose portion E has a hose adapter E-1 which is configured for connection to the expiration channel 4 of the ventilation apparatus 2.

The hose adapter E-1 has a hose branch point E-2 from which at least two expiration branches E-3 branch off (1, 2 for patients 1 and 2).

Each expiration branch E-3 has at least one attachment piece E-9 for connection to a patient interface 11. The patient interface 11 can be a Y-piece which is connected to a mask or to a tube, or the patient interface can be directly a mask or a tube.

Each expiration branch E-3 has at least one nonreturn valve E-4.

The expiratory hose portion E can additionally have, in at least one expiration branch E-3, at least one valve E-6 (not shown). The valve can be configured and designed to adjust an expiratory pressure in the respective expiration branch. If the valve E-6 is arranged for example in the branch 2 (for patient 2), another (lower) expiratory pressure can be set for patient 2 compared to that for patient 1.

The expiratory hose portion E can have a one-part or multi-part design. For example, different functional parts and hoses can be connected such that they yield the expiratory hose portion E.

For example

| Item | Number | Hose |
|---|---|---|
| E-1 | 1 | 22 mm hose 2x female |
| E-2 | 1 | Y-piece |
| E-3 | 2 | connector 2x 22 mm female |
| E-4 | 2 | directional valve (2x male) |
| E-6 | | valve |

The hose system 1 according to the invention preferably comprises an inspiratory hose portion I which is configured for connection to a respective inspiration channel 3 of a ventilation apparatus 2 and which is configured to convey an inspiratory respiratory gas flow from the ventilation apparatus to a patient interface 11, wherein the inspiratory hose portion I has a hose adapter I-1 which is configured for connection to the inspiration channel 3 of the ventilation apparatus 2, wherein the hose adapter I-1 has a hose branch point I-2 from which at least two inspiration branches I-3 branch off, wherein each inspiration branch I-3 has at least one attachment piece I-9 for connection to a patient interface 11, wherein the hose system has an expiratory hose portion E which is configured for connection to a respective expiration channel 4 of a ventilation apparatus 2 and which is configured to convey an expiratory respiratory gas flow from the patient interface 11 to the ventilation apparatus, wherein the expiratory hose portion E has a hose adapter E-1 which is configured for connection to the expiration channel 4 of the ventilation apparatus 2, wherein the hose adapter E-1 has a hose branch point E-2 from which at least two expiration branches E-3 branch off, wherein each expiration branch E-3 has at least one attachment piece E-9 for connection to a patient interface 11.

Figure 3:
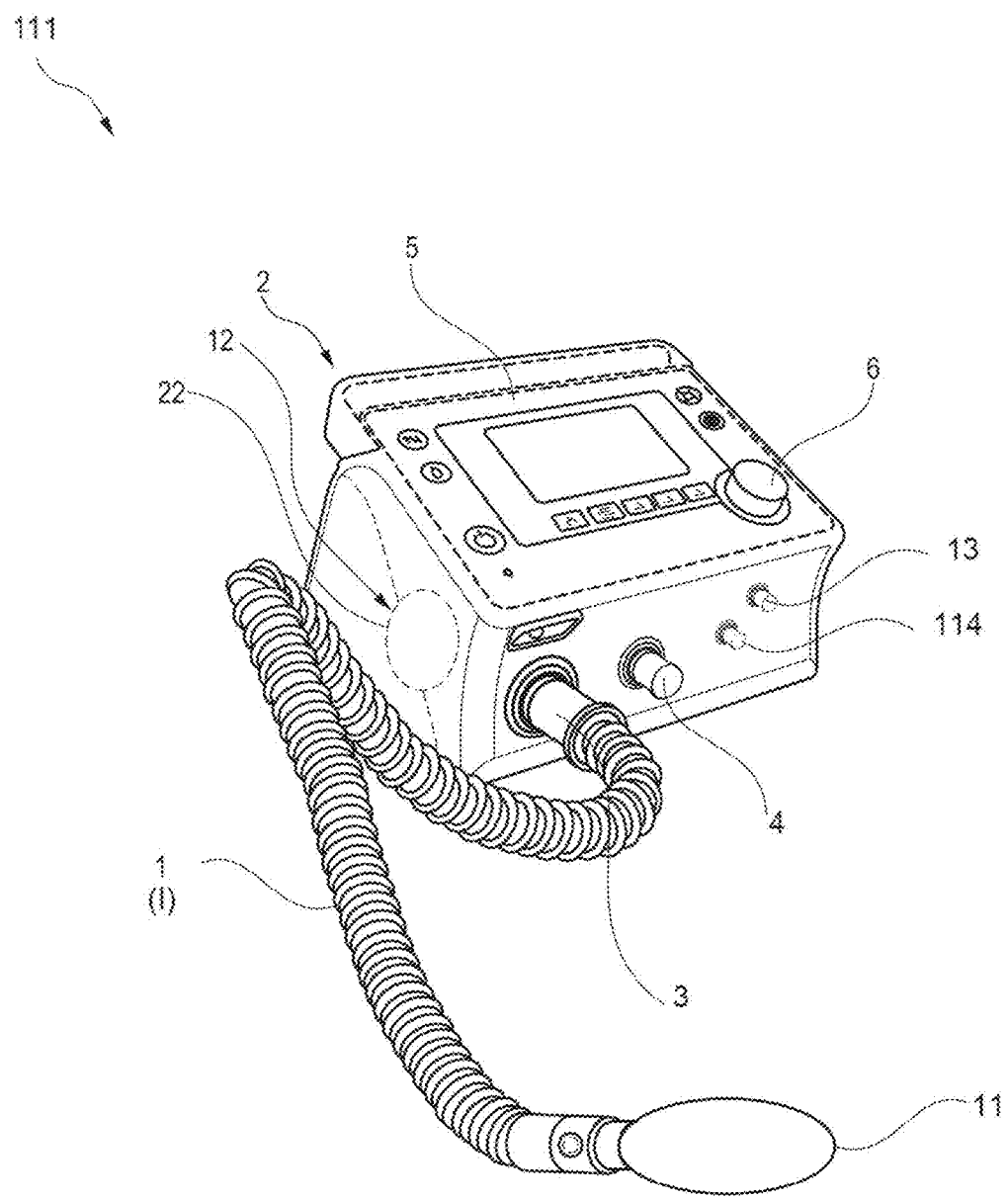
FIG. 3 shows a basic set-up of a ventilation apparatus

FIG. 3 shows a ventilation apparatus 2 according to the invention with an inspiration channel 3 and/or an expiration channel 4 for attaching an inspiratory hose portion I and/or an expiratory hose portion E. In the interior of its housing, the ventilation apparatus 2 has a ventilation device 12 which is equipped with a respiratory gas source (fan) and/or a valve device for generating a respiratory gas flow (collectively shown by reference numeral 22). The respiratory gas flow is supplied to the patient via a hose system 1 which is coupled to the ventilation device 12 and which has a patient interface 11.

The ventilation apparatus 2 comprises a display device 5 and an operating device 6. Combinations of operating device 6 and display device 5 can also be provided, for example in the form of a touch-sensitive display surface or a touch screen. Here, the display device 5 also serves to show information from the optional monitoring device 13. The monitoring device 13 can be an SpO2 sensor and can also output its information on further display devices not shown here, e.g. on a computer display or a tablet or a hospital monitor or the like.

The ventilation apparatus 2 is operatively connected to at least one sensor means 14 which has one or more sensors for detecting respiration parameters and, if appropriate, further variables characteristic of the respiration. For example, the sensor means 14 comprises a pressure sensor (not shown in detail here) which detects the pressure conditions of the respiratory gas flow, and/or a flow sensor which detects the flow. The sensor means 14 can be formed in the ventilation apparatus, for example adjacent to the inspiration channel 3 and/or the expiration channel 4 and/or the pressure port 114.

The sensor means 14 is for example also operatively connected to the control device 12, such that the detected variables can also be at least partially processed by the control device 12.

The ventilation apparatus 2 here comprises a control device 12 which is arranged in a concealed fashion inside the housing and which actuates the respiratory gas source 22. For example, CPAP ventilation or ASAP ventilation or bilevel ventilation or any desired clinical form of ventilation can be carried out. For ventilation, the respiratory gas source 22 is set, for example, to a defined respiratory gas flow and/or a respiratory gas pressure. The control device 12 can make available a required minimum pressure and/or can compensate for pressure fluctuations that are caused by the breathing activity of the user. For example, the control device 12 detects, by way of the sensor means 14, the current pressure in the patient interface or in the hose system 1 and regulates the power of the respiratory gas source 22 accordingly, until a desired ventilation pressure is present.

The ventilation apparatus is configured and designed to ventilate with a bilevel mode (BiLevel, BiLevel ST, PCV, Mandatory BiLevel, PC-APRV). A trigger function can be switched off.

A ramp function, which controls the transition of the inspiratory and expiratory or expiratory and inspiratory pressures, can be adjustable. The ramp should be set, for example, to a value of >=0.3 second.

Inspiratory ramp: This means the time in which the ventilation pressure is regulated from the lower pressure level to the upper pressure level (Pinsp), i.e. the mandatory inspiratory ramp (there should also be no pressure-support ramps, since the trigger after all is switched off).

A tube compensation, which compensates for pressure drops through a tube, may be present. This has to be switched off for the use of the invention.

A ByFlow function may be present and is to be increased if the patients are not fully sedated (recommendation-number of patients * 3 l/min).

In all bilevel modes, at least one irrigation flow is flowing at all times. By default, this is at 3 l/min. This value is adjustable; 3 l/min is the lowest possible value. In other words, during the inspiration, the flow in the inspiratory hose I is at least 3 l/min higher than the flow that flows to the patient. During the expiration, the flow in the inspiratory hose is then also at least 3 l/min. The irrigation flow forms a buffer which covers the flow requirement of the patient when the latter begins inhalation (until the control readjusts or until the valves readjust). It is therefore also recommended to increase this value from 3 ml/min if two not fully sedated patients are connected.

A supplementary CO2 measurement can be performed for a patient.

According to the invention, spontaneous respiration is always possible for each patient during the ventilation. The ventilation cycles do not have to be in synchrony. In the bilevel mode, the regulation of the pressure and the regulation of the flow are completely decoupled. When the trigger is switched off, the pressure changes are carried out by the clock and the inspiratory flow regulation provides the flow that both patients require together. The patients can inhale and exhale at the lower and at the upper pressure level. If the patients are not sedated, it happens that the inhalation and exhalation do not take place in synchrony with the pressure changes.

The patients are also completely decoupled from each other by the nonreturn valves, and it is therefore also possible for one patient to inhale while the other exhales. The trigger synchronizes the pressure change in the bilevel modes. Spontaneous respiration is always possible independently of the actual pressure (e.g. also during the upward or downward ramp).

The inspiratory trigger and the expiratory trigger should be switched off.

According to the invention, three possible scenarios for example are provided in particular:
1. The two patients are fully sedated and paired/selected such that they require the same ventilation pressures. In this case, the components I-1, I-2, E-1 and E-2 would be sufficient for the ventilation of both patients. I-2 and E-2 are Y-pieces, because there is not so much space there. T-pieces would also be possible in principle.
2. The two patients are not fully sedated but are also paired/selected such that they require the same ventilation pressures. If the two patients want to inhale and exhale independently of each other, they have to be decoupled from each other. The nonreturn valves (twice in each case) I-4 and E-4 take over (see above). I-3 and E-3 are adapters, since there are Y-pieces and these nonreturn valves only with male connectors.
3. The two patients are not fully sedated and are also not paired/selected such that they require the same ventilation pressures. In this case, the ventilation apparatus would be adjusted such that the patient with the greater pressure requirement is adequately supplied. This patient is then to be connected to port "1". The patient with the lesser pressure requirement is then connected to port "2". I-5 is an adapter for 1-6, which is a kind of throttle valve. I-7 is an adapter which converts the output flow of the throttle valve back to a 22 mm cone. I-8 is a T-piece which permits the attachment of a Luer measurement hose. Using a pressure measurement port 114 on the ventilation apparatus, the pressure that patient "2" receives can then be measured and/or presented on the display. I-9 is in turn an adapter which converts the output of the T-piece (here there is only a 15 mm cone) to 22 mm, such that a normal ventilation hose can be attached.

If the two patients are not fully sedated and are also not paired/selected such that they require the same ventilation pressures, the ventilation system 111 then comprises a hose system and a ventilation apparatus, wherein the ventilation apparatus 2 has a display device 5 which shows at least two pressure curves 15, 150, 250, and wherein the pressure 150 corresponds to the pressure which is predefined by the ventilation apparatus and which is present in the inspiration channel 3 (and in the inspiratory hose portion I), wherein the inspiratory hose portion I divides into at least two inspiration branches (1, 2 for two patients), wherein in at least one inspiration branch I at least one adjustable valve I-6 is arranged which is configured and designed to adjust the inspiratory flow and/or pressure for this branch 2, wherein the inspiratory hose portion I additionally has, downstream from the valve I-6 in the direction of flow, a tap I-8 which is configured and designed for the determination of a pressure, wherein the tap I-8 permits a separate pressure determination 250 in the inspiration branch 2 (for patient 2), wherein the pressure 150 is present in the inspiration branch 1 (for patient 1), and wherein the pressure 250 is for example less than the pressure 150.

Figure 4:
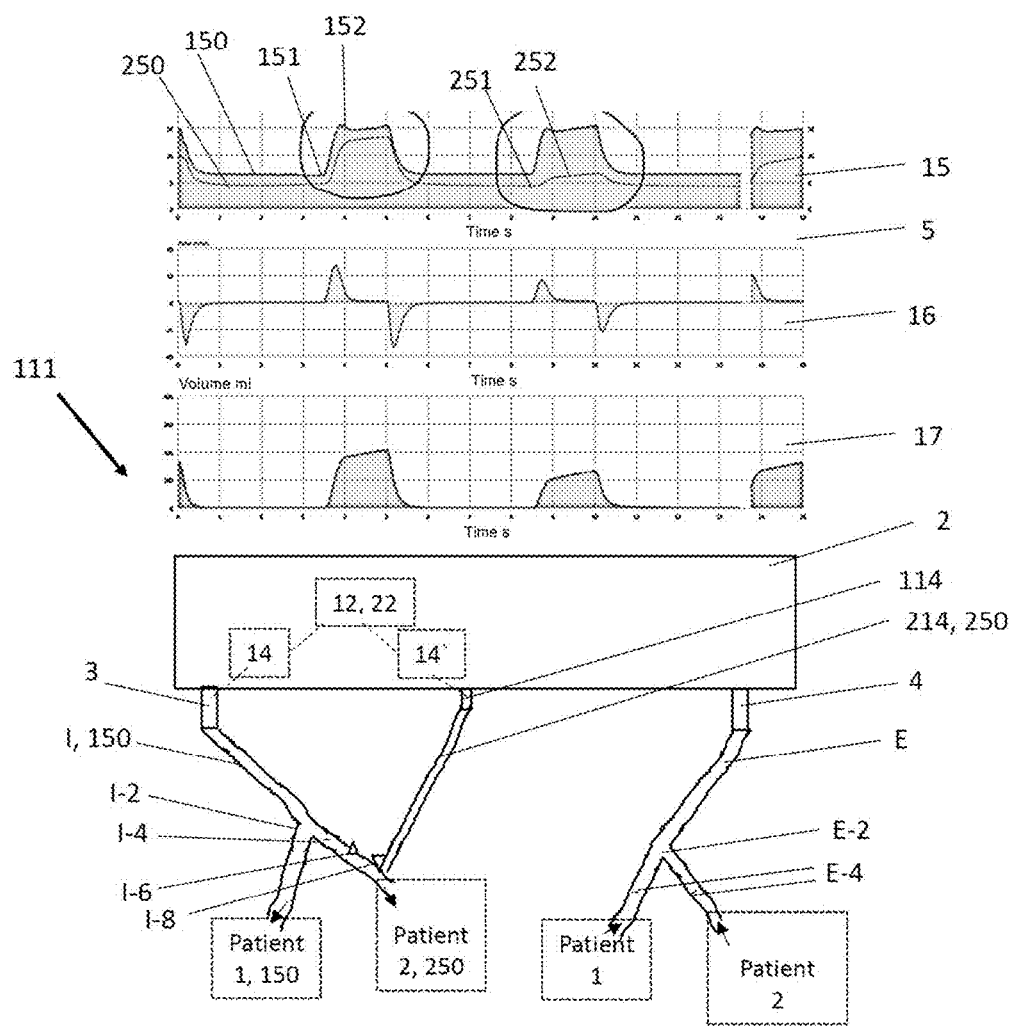
FIG. 4 shows a schematic view of the ventilation system.

FIG. 4 shows the ventilation system 111, comprising a hose system I, E and a ventilation apparatus 2, with a presentation on the display device 5 (for patients according to scenario 3).

The curves for pressure 15, flow 16 and volume 17 are presented one below another on the display device 5. Expiratory pressures 151, 251 and inspiratory pressures 152, 252 can be seen. Two pressure curves 150, 250 are shown. The pressure 150 corresponds to the pressure which is predefined by the ventilation apparatus and which is present in the inspiratory hose portion I.

The inspiratory hose portion I can additionally have at least one nonreturn valve I-4 in each inspiration branch. The inspiratory hose portion I can additionally have at least one valve I-6 in at least one inspiration branch I.

The valve I-6 is for example configured as an adjustable throttle valve, in order to adjust the inspiratory flow. The valve I-6 is for example an adjustable PEEP valve I-6, which is configured as an adjustable throttle valve, in order to adjust the inspiratory flow.

The inspiratory hose portion I can additionally have, in the direction of flow, at least one closeable tap I-8 for respiratory gas.

The closeable tap I-8 can be a Luer connector. The closeable tap I-8 (Luer connector) can be arranged downstream from the valve I-6 in an inspiratory flow direction and can be configured and designed for connection to a pressure measurement port 114 of the ventilation apparatus.

The tap I-8 is then connected with a hose 214 to the pressure measurement port 114 of the ventilation apparatus 2 and thus permits a separate pressure determination for patient 2. Moreover, by way of the valve I-6, a separate pressure 250 can be set for patient 2 (which is lower than the pressure for patient 1).

The pressure 250 corresponds to the pressure that is determined at the tap I-8. The pressure is determined there via a pressure measurement hose 214, which connects the tap I-8 pneumatically to the pressure measurement port 114 of the ventilation apparatus 2.

The pressure 150 is predefined via the control unit 12 which, for this purpose, suitably controls the respiratory gas source 22. A pressure sensor 14 can additionally determine the pressure.

The pressure 250 is determined via the pressure sensor 14', which is assigned to the pressure measurement port 114. The pressure sensors 14 and 14' can be identical or different. The pressure 250 is set by the valve I-6.

The control device presents both pressure measurement values 150, 250 on the display, preferably synchronized in terms of time.

What is claimed is:

1. A hose system for use with a ventilation apparatus, wherein the hose system comprises an inspiratory hose portion which is configured for connection to an inspiration channel of the ventilation apparatus and is configured to convey an inspiratory respiratory gas flow from the ventilation apparatus to a patient interface, and wherein
    the inspiratory hose portion comprises a hose adapter which is configured for connection to the inspiration channel of the ventilation apparatus,
    the hose adapter comprises a hose branch point from which at least two inspiration branches branch off, and
    wherein each inspiration branch of the at least two inspiration branches comprises
    at least one attachment piece for connection to the patient interface,
    at least one nonreturn valve,
    at least one valve which is configured as an adjustable throttle valve, in order to adjust the inspiratory gas flow, and
    at least one tap for a respiratory gas, the at least one tap being closeable and arranged downstream from the adjustable throttle valve in an inspiratory flow direction and being configured for connection to a pressure measurement port of the ventilation apparatus.

2. The hose system of claim 1, wherein the at least one valve which is configured as an adjustable throttle valve is an adjustable PEEP valve.

3. The hose system of claim 1, wherein the at least one tap for a respiratory gas is a pressure sensor.

4. The hose system of claim 1, wherein the at least one tap for a respiratory gas is a Luer connector.

5. The hose system of claim 1, wherein at least four inspiration branches branch off from the hose branch point.

6. The hose system of claim 1, wherein the hose system further comprises an expiratory hose portion which is configured for connection to an expiration channel of the ventilation apparatus and is configured to convey an expiratory respiratory gas flow from the patient interface to the ventilation apparatus,
    wherein the expiratory hose portion comprises a hose adapter for the respiratory hose portion which is configured for connection to the expiration channel of the ventilation apparatus,
    wherein the hose adapter for the respiratory hose portion comprises a hose branch point from which at least two expiration branches branch off, and
    wherein each expiration branch comprises at least one attachment piece for connection to the patient interface.

7. The hose system of claim 6, wherein additionally each expiration branch comprises at least one nonreturn valve.

8. A ventilation apparatus, wherein the ventilation apparatus comprises an inspiration channel for attaching the hose system of claim 1 and is connected this hose system.

9. The ventilation apparatus of claim 8, wherein the ventilation apparatus comprises at least one pressure measurement port which comprises a pressure sensor, wherein the pressure measurement port is connected with a pressure measurement hose pneumatically to the tap of the inspiratory hose portion, wherein the pressure sensor determines the pressure in the inspiratory hose portion in a region of the tap, and wherein the pressure is shown via a control device on a display device.

10. A ventilation system which comprises the hose system of claim 1 and a ventilation apparatus connected thereto, wherein the ventilation apparatus comprises a display device which shows at least two pressure curves, and wherein a first pressure corresponds to a pressure which is predefined by the ventilation apparatus and which is present in the inspiration channel and in the inspiratory hose portion, wherein the inspiratory hose portion divides into at least two inspiration branches for at least two patients, wherein in at least one first inspiration branch at least one adjustable valve is arranged and configured to adjust an inspiratory flow and/or pressure for this branch, wherein the inspiratory hose portion additionally comprises, downstream from the at least one adjustable valve in a direction of flow, a tap which is configured for determination of a pressure, wherein the tap permits a separate pressure determination in a second inspiration branch.

* * * * *